United States Patent [19]

Faust

[11] Patent Number: 5,140,751
[45] Date of Patent: Aug. 25, 1992

[54] MONOTUBE CABLE FIBER ACCESS TOOL

[75] Inventor: Alison M. Faust, Hickory, N.C.

[73] Assignee: Alcatel NA Cable Systems, Inc., Claremont, N.C.

[21] Appl. No.: 713,749

[22] Filed: Jun. 11, 1991

[51] Int. Cl.⁵ .............................. H02G 1/12
[52] U.S. Cl. ..................... 30/91.1; 30/90.4; 81/9.4
[58] Field of Search ............ 30/90.1, 90.4, 289, 30/90.8, 91.1; 83/924, 947; 81/9.4, 9.51

[56] References Cited

U.S. PATENT DOCUMENTS

| | | | |
|---|---|---|---|
| 2,627,768 | 2/1953 | Cook | 30/91.1 |
| 4,366,619 | 1/1983 | Bieganski | 30/90.1 |
| 4,972,581 | 11/1990 | McCollum et al. | 30/90.1 |

FOREIGN PATENT DOCUMENTS

| | | | |
|---|---|---|---|
| 3904323 | 8/1990 | Fed. Rep. of Germany | 30/90.1 |
| 1551842 | 9/1979 | United Kingdom | 81/9.4 |

*Primary Examiner*—Douglas D. Watts
*Assistant Examiner*—Clark F. Dexter
*Attorney, Agent, or Firm*—Ware, Fressola, Van Der Sluys & Adolphson

[57] ABSTRACT

A tool is provided for the purpose of allowing access to optical fibers held within a monotube of a monotube design optical fiber cable. The monotube is held in a central channel extending the length of and through the substantial center of the tool. The strength members of the cable, which extend longitudinally on both sides of the monotube, are held in channels extending longitudinally with and on both sides of the tool's central channel. A blade is inserted from the main body into the monotube so as to define a chord through the cross section of the monotube. The tool is drawn along the monotube so as to remove a portion of its protective covering thereby allowing access to the optical fibers held therein without having to sever the strength members. Various inserts may be utilized with the main body of the tool, the various inserts corresponding to the different monotube dimensions of the various monotube optical fiber cables.

15 Claims, 3 Drawing Sheets

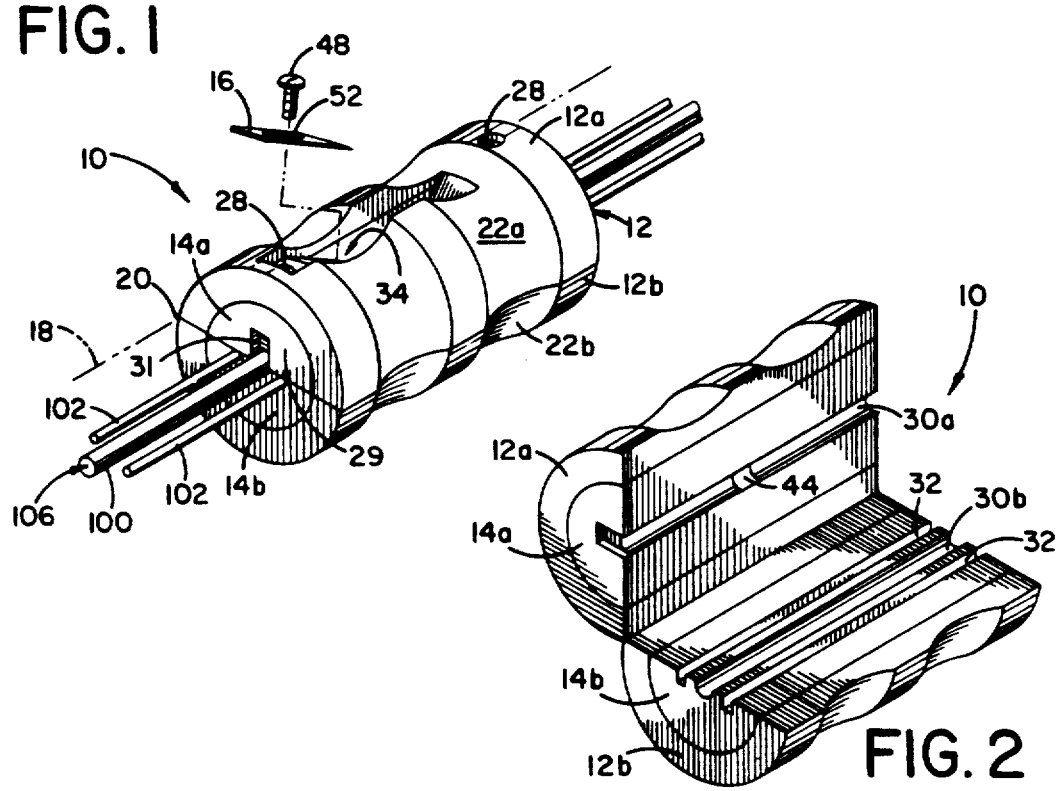
FIG. 1
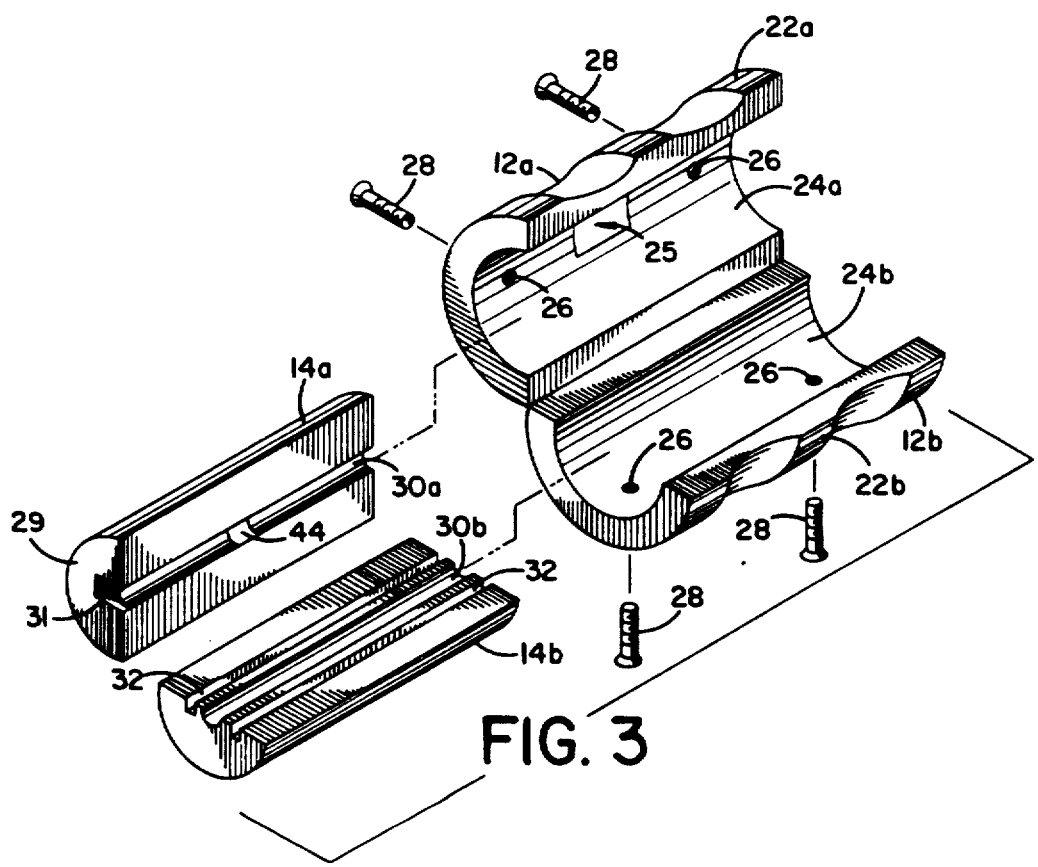
FIG. 2
FIG. 3

MONOTUBE CABLE FIBER ACCESS TOOL

BACKGROUND OF THE INVENTION

1. Field of the Invention

This invention relates to a tool for removing a portion of a buffer tube used in a monotube type of optical fiber cable in order to selectively access optical fibers found therein.

2. Description of the Prior Art

The use of optical fibers in telephonic and other communication is well-known in the prior art. In order to protect the delicate optical fibers and to facilitate the laying of optical fibers, it is well-known to dispose a number of fibers in a monotube type optical fiber cable.

In a known cable assembly, radial strength yarns are helically or contrahelically wrapped around a single centrally elongate buffer tube, or "monotube", and the resultant structure is encased within a common protective sheath of steel. Two elongate strength or support members are disposed on either side of the structure which is then further encased within a plastic material such as polyethylene, polyurethane, polyvinylchloride, etc. The interior of the cable, between the radial strength yarns, is impregnated with a resin or oil-like substance providing lubrication and water resistance. The monotube is filled with a moisture-resistant gel for providing a light buffer to external forces and further for improving the cable's resistance to water ingression.

While optical fibers have many advantages, such as high density and lack of electromagnetic interference, over traditional conducting cable in the communications field, they have a major disadvantage in that there is degradation in transmission efficiency after a fiber has been spliced or in any way joined with another fiber after the original manufacture. Such a splice may be inevitable in the event of fiber breakage, the rerouting of a communications line or the insertion of an intermediate device within the communications line. However, such a splice may only be required for a single or limited number of fibers within the monotube. Under such circumstances, it would be extremely time consuming and degrading to the communication efficiency to completely sever and subsequently splice all the optical fibers in a monotube in order to access a single optical fiber. It would therefore be advantageous to provide a device which would allow access to a limited number of fibers within a monotube design fiber optic cable without cutting or otherwise disturbing the remaining optical fibers.

AT&T Western Electric manufactures Unit Slitter Tool (961B or 961C) which consists of two rectangular sub-assemblies which are attached to one another by spring loaded shafts at each end. On the inside surfaces of these two sub-assemblies are plastic inserts with semi-circular grooves which hold the monotube in place for slitting when the sub-assemblies are closed. Extending inwardly into the semi-circular groove of each inside surface is a blade for cutting the monotube. A blade holder having two screws is utilized to hold the blade in place. Each blade is disposed so that it extends towards the center of the semi-circular groove and is parallel to the groove longitudinal axis.

In order to access an optical fiber, the monotube is placed between the two sub-assemblies so that it is disposed within one of the semi-circular grooves. The sub-assemblies are then compressed against each other thereby enclosing the monotube. As the monotube is enclosed, the two blades, one blade from each subassembly, are driven into the monotube. The user then draws the tool along to the longitudinal axis of the monotube thereby cutting the buffer tube in two and exposing the optical fibers. The two halves of the monotube are then removed leaving all fibers totally exposed and unprotected.

The AT&T Western Electric device exhibited several disadvantages. The monotube is cut by two blades each extending towards the center of the tube resulting in a more intrusive device than is sometimes necessary. Such intrusion may result in unwanted nicking or severing of an optical fiber, especially if the blades are dirty, dull, improperly adjusted or loosely attached. In addition, there is no way to monitor for such a malfunction since the blade operation is hidden from the operator's view. In order to properly adjust the blades, blade adjustment requires the loosening of four screws, the insertion of a calibration standard and the adjustment of two set screws for blade heights. This is a tedious process which may actually inhibit the operator from consistently calibrating the blade height which may increase the probability of fiber damage during the use of the tool.

Since the tool is very large and awkward in shape it is difficult to manipulate and is ineffective for use in situations where there are constraints upon the amount of cable access space and fiber access length. For example, due to the device's length, at least ten inches of monotube must be exposed in order to access six inches of fiber length. For shorter monotube access lengths, this tool is not usable. In addition, the tool does not allow the operator to easily access fibers without severing the rigid strength members of the monotube fiber optic cable. In many installations, it is desirable that the strength members are left intact to provide additional tensile strength in the closure. The AT&T tool is difficult to use when the strength members must be left intact.

Alcatel Cable Systems manufactures a fiber access tool for accessing optical fibers in buffer tubes of loose-tube design optical fiber cables, described in U.S. Pat. No. 4,972,581, which is sold under the designation 'pocket shaver'. The Alcatel fiber access tool comprises three major parts—a body, a clamp and a blade. The body is roughly cubical in shape and has an open channel adapted to receive a portion of the cross section of a buffer tube such as those found in loose-tube optical fiber cables. The clamp is designed to be slidably received onto the body thereby closing the channel and engaging the loose-tube buffer tube between the body and the clamp. The clamp presents an edged surface in order to allow the clamp to be inserted between a buffer tube and a cable when only a little slack is present.

The blade of the Alcatel fiber access tool is adjustably attached to the body so that the edge extends into the channel. The edge of the blade is perpendicular to the axis of the channel and defines a chord across the circular cross-section of the channel. The blade can remove a section of the buffer tube as the tool is moved along the tube, thereby allowing access to the optical fibers therein.

The Alcatel 'pocket shaver', however, may be used only with those optical fiber cables having helically or contrahelically wrapped buffer tubes, such as those found in the loose-tube optical fiber cable or a tight buffered optical fiber cable. The 'pocket shaver' fiber access tool cannot be utilized for accessing the optical fibers i monotube type optical fiber cable. Since the tool is very small and lightweight, it is ineffective for use in applications where the buffer tube to be cut is much larger and more rigid than loose-tube type buffer tubes, such as a monotube. In addition, the tool is not designed to allow the operator to access the fibers of a monotube fiber optic cable without severing the rigid strength members of the cable. In many installations, it is desirable that the strength members are left intact to provide additional tensile strength in the closure. Thus, the Alcatel 'pocket shaver' is difficult to use for monotube fiber optic cables and cannot be used without severing at least one of the elongate strength members.

As can clearly be seen, providing a fiber access tool for use with monotube fiber optic cables is a difficult problem which has not been previously resolved and even with the current level of understanding of optical fiber cables, there has not previously been a practical optical fiber access tool which may be used on a monotube fiber optic cable although such a tool is desirable.

SUMMARY OF THE INVENTION

It is therefore a primary object of this invention to provide an optical fiber access tool for use with a monotube-type optical fiber cable which affects minimal intrusion into the monotube.

A further object is to provide an optical fiber access tool which may be used on a monotube fiber optic cable to allow the operator to easily access the fibers without severing the rigid strength members of the monotube cable.

Further object of this invention is to provide a optical fiber access tool which has a cutting depth which is easily adjusted, is resistant to malfunction which may cause damage to the optical fibers, performs the cutting action in essentially open view of the user and does not have an exposed blade which may be a hazard to the user.

In accordance with the present invention, an optical fiber access tool is provided which includes a body, an insert and a blade.

The body is roughly cylindrical in shape and has a plurality of ridges and radii on its outer surface as a grip to help eliminate hand slippage during the shaving step. The body comprises two halves which are hinged together along a longitudinally extending axis at the outer surface of the cylinder so that the halves may close around the monotube and rigid strength members. On the inner surface of each half, a semi-cylindrically-shaped groove extends the length of each half. When the halves are closed, the grooves form a single cylindrical channel. An insert comprises two halves, semi-cylindrical in shape, having outer surfaces corresponding with the cylindrically-shaped inner surfaces of the body halves. The insert halves, on their inner surfaces, comprise center and outer channels extending longitudinally therealong for closing around the monotube and rigid strength members, respectively, when the tool is assembled. This allows the monotube to be easily cut without severing the elongate strength members.

The blade of the tool is adjustably attached to the body so that the edge extends into the center channel. The edge of the blade is perpendicular to the axis of the channel and defines a chord across the circular cross-section of the channel. The blade can remove a section of the monotube as the tool is moved along the monotube, thereby allowing access to the optical fibers found therein. The blade is not in an intrusive position so as to risk nicking or severing an optical fiber. The body of the blade is placed at an acute angle with the monotube so that a loose blade would rise away from the monotube during the cutting process thereby effecting too little cutting instead of too much. The blade is in plain view of the user so that the cutting process may be monitored, allowing the user to stop in the event of an observed malfunction or misadjustment. Finally, while the blade remains in plain view, the user is protected from contact with the blade edge which is surrounded by a slot in the body. The blade is easily removed for cleaning or replacement.

BRIEF DESCRIPTION OF THE DRAWINGS

Further objects and advantages of the invention will become apparent from the following description and claims, and from the accompanying drawings, wherein:

FIG. 1 is a partially exploded perspective view of the present invention.

FIG. 2 is a perspective view of the present invention shown partially assembled.

FIG. 3 is an exploded perspective view of the present invention.

DETAILED DESCRIPTION OF THE INVENTION

Figure 4:
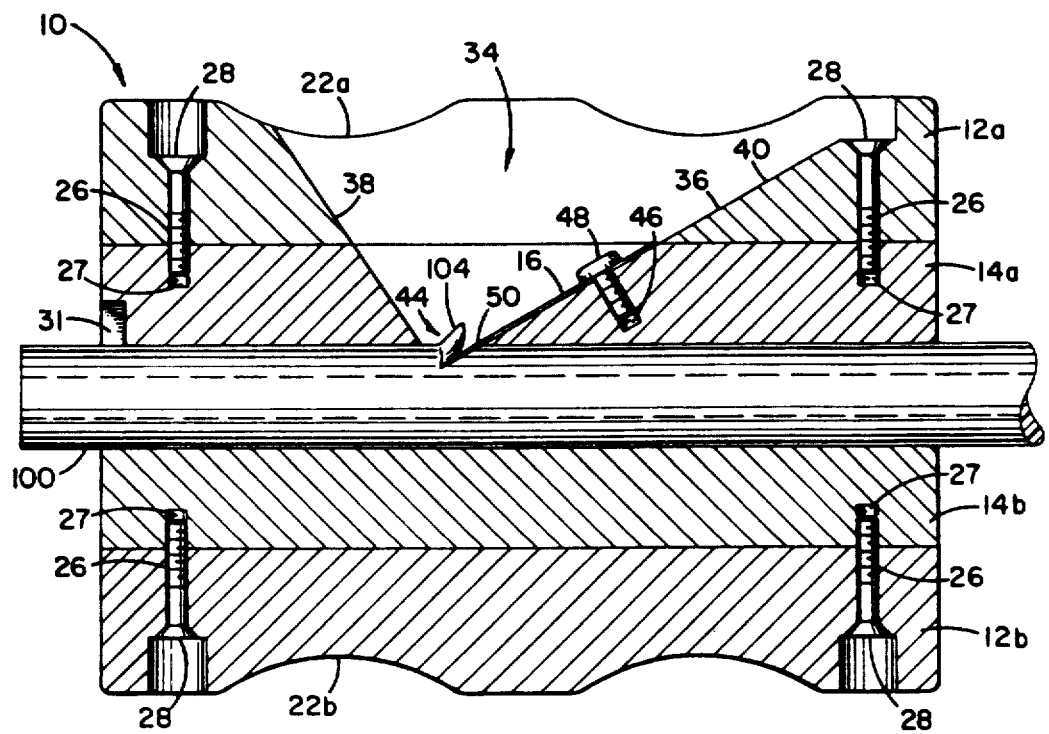
FIG. 4 is a cross-section taken along line 4—4 of FIG. 5.

Referring now to the drawings wherein like numerals indicate like elements throughout the several views, the tool 10 of the present invention includes a main body 12, inserts 14a and 14b, and blade 16.

The main body 12 comprises upper and lower halves 12a and 12b which are hingedly joined along a hinge axis 18 by hinge 20. The main body halves 12a, 12b each include a semi-cylindrically shaped outer surface 22a, 22b, and a semi-cylindrically shaped inner surface 24a, 24b. When the main body halves 12a, 12b are in the closed position, the inner surfaces 24a, 24b form a cylindrically shaped insert channel for retaining insert halves 14a, 14b. The main body halves 12a, 12b further include screw holes 26 which are tapped for retaining screws 28 for holding insert halves 14a, 14b in position.

Top and bottom insert halves 14a, 14b are semi-cylindrically shaped and are dimensioned to be disposed snugly within the insert channel of the main body 12. Each insert half 14a, 14b has tapped screw holes (shown as element 27 in FIG. 4) corresponding to screw holes 26 of main body halves 12a, 12b and securing screws 28. Each insert half 14a, 14b further includes an open channel 30a, 30b, having a semi-circular cross-section with a diameter approximately equal to that of a monotube 100 to be cut. Each open channel 30a, 30b extends the length of insert half 14a, 14b. On both sides of, and parallel to, channel 30b of bottom insert half 14b are strength member guide slots 32 having a square cross-section with a height and width large enough to retain the strength members of the monotube cable without exerting any pressure thereon.

The outer surface 22a of the main body half 12a includes a slot 34 which is parallel to and overlies channel 30a of top insert half 14a. Slot 34 does not extend the length of upper main body half 12a but rather lies longitudinally in the substantial center of main body half 12a. The slot extends from outer surface 22a to inner surface 24a thereby forming aperture 25 as can be seen in FIG. 3. As can be seen most clearly in FIG. 4, slot 34 has a bottom 36 which is formed of two sections. A front section 38 extends at an angle from outer surface 22a of main body half 12a into top insert half 14a. A rear section 40 inclines downwardly in an opposite direction from outer surface 22a into top insert half 14a. Both the front section 38 and rear section 40 intersect channel 30a of top insert half 14a. The intersection of surfaces 38 and 40 with channel 30a form an opening 44 between the slot 34 and channel 30a. Surface 40 includes a threaded aperture 46 into which a screw 48 may be threadably received.

The blade 16 is of generally rectangular shape with the narrow sides forming cutting edge 50. A slot 52 is formed longitudinally in the blade. The blade 16 is fastened to the top insert half 14a by inserting screw 48 into slot 34 and into threaded aperture 46. The edge 50 of blade 16 extends into opening 44 and defines a horizontal chord across the semi-circular cross-section of channel 30a.

Bottom insert half 14b includes a semi-circular channel 30b conventionally sized to accept the monotube 100 and having a radius slightly larger than that of monotube 100. On both sides of, and parallel to, channel 14b are strength member slots 32 having a cross-sectional shape of a square. Strength member slots 32 are dimensioned to receive strength members 102 of a monotube cable. The strength member slots allow the monotube to be cut without severing the strength members.

Figure 6:
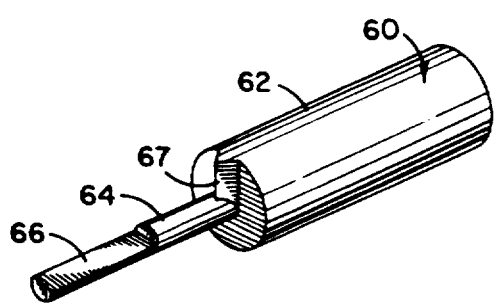
FIG. 6 is a view in perspective of a gauge for use with the present invention.
Figure 7:
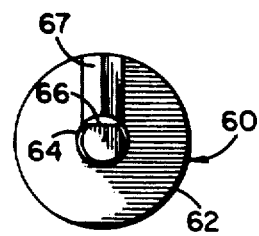
FIG. 7 is a front view of the gauge of FIG. 6.

An accessory for use with tool 10 is a gauge 60 shown in FIGS. 6 and 7. Gauge 60 includes a handle 62 from which cylinder 64 extends. Cylinder 64 has a diameter substantially equal to a standard sized monotube and is dimensioned to be slidably received in the closed channel defined by channels 30a and 30b. Notch 66 is cut from the cylinder 64 and defines a chord in the circular cross-section of the cylinder. The depth of notch corresponds to the appropriate depth to which blade 16 should be inserted into the monotube.

Figure 8:
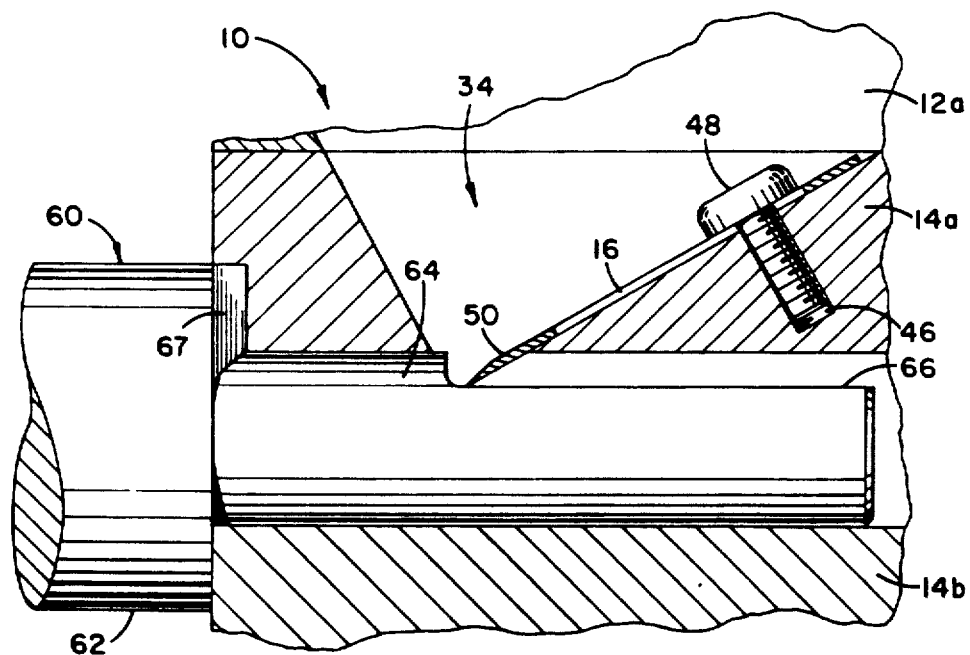
FIG. 8 is a cross section of the present invention with its accessory gauge inserted in position for undertaking the depth-of-cut setting procedure.

The gauge 60 is used to set the depth of cut for the blade 16 to permit the tool to cut through the monotube 100 without cutting the optical fibers contained therewithin. The following depth-of-cut setting procedure would be undertaken when (1) a new blade is being positioned for use in the tool 10 or (2) an existing blade in the tool 10 is in need of adjustment or has been removed for cleaning, etc. Referring to FIG. 8, the gauge 60 is shown inserted in the closed channel formed by channels 30a and 30b. The pointed projection 67 of gauge 60 is positioned within the indentation 31 in the front surface 29 of top insert half 14a. Thereinafter, the blade 16 is positioned along the rear section 40 of bottom 36 of slot 34 so that the blade 16 abuts the flat surface of notch 66 on gauge 60 and thereby extends an appropriate depth into channel 30a. Screw 48 is then tightened so as to secure blade 16 to top insert half 14a and the tool is ready for use after the gauge 60 is slidably removed therefrom.

Figure 5:
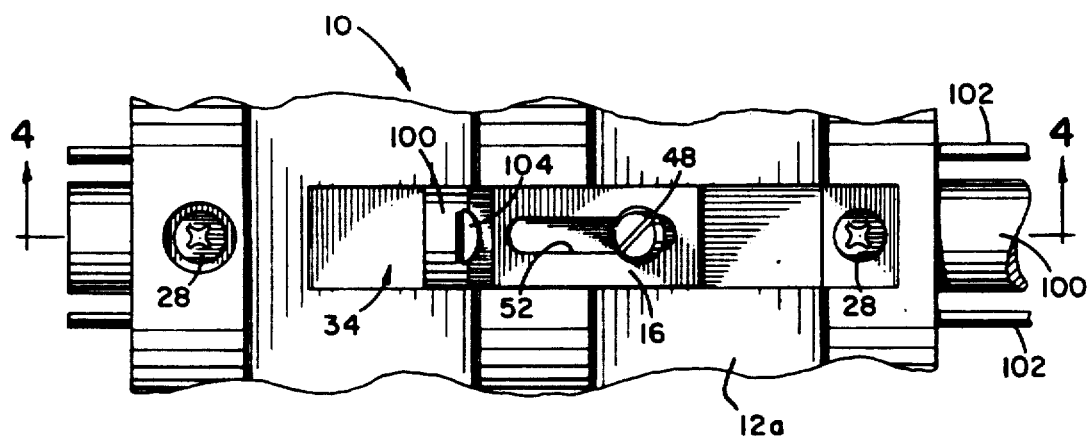
FIG. 5 is a top view with portions of the body and blade being cut away.

Once the depth of cut is properly set, in order to use the tool 10, one opens the protective sheath of a monotube cable (not shown) to expose the monotube 100 and the longitudinally extending strength members 102. Using gauge 60, the size of the monotube 100 and the size of cylinder 64 should be compared to insure the tool 10 is the correct size for the monotube 100. After this is confirmed, the disposed lengths of monotube 100 and strength members 102 may be disposed in channels 30b and 32, respectively, of bottom insert half 14b. The upper main body half 12a and top insert half 14a may then be hingedly closed around the monotube 100 and its corresponding strength members 102 so that the monotube 100 and the strength members 102 are completely enclosed within their corresponding channels. As the upper main body half 12a and top insert half 14a are closed on top of monotube 100, they surround the monotube 100 forcing it against blade 16 to make a cut which removes a portion 104 of buffer tube 100. (See FIGS. 4 and 5). The tool then is drawn along the monotube 100 in the proper direction so that the blade 16 cuts a desired portion of the monotube 100 thereby allowing selective access to the optical fibers 106 contained therein.

Following the cutting of the monotube 100, the main body halves, 12a, 12b and insert halves 14a, 14b may then be allowed to hingedly open from around monotube 100 and strength members 102. The tool 10 may then be appropriately manipulated to disengage it from the monotube 100. The hinge 20 on main body 12 may be springloaded so that when the halves 12a, 12b are released by the user, the tool 10 opens without having to pry the halves 12a, 12b apart.

It should be understood that the main body of the tool can be of various sizes, shapes and designs. Furthermore, it is contemplated that the present invention could incorporate inserts having various size monotube channels and strength member channels so as to accommodate all sizes of monotube cables. The inserts need only have a corresponding outer shape so that it may be disposed between main body halves 12a, 12b.

In order to accommodate various standard size monotubes, a set of access tools, including a plurality of gauges, would be provided to the user. Each of the individual inserts and gauges would correspond in size to a different standard size monotube and would be marked or labeled appropriately to facilitate use thereof. For economy purposes, the gauges can be provided with two differently sized cylinders extending outwardly from opposite ends of a single centrally located handle. It will therefore be seen from the above that my invention provides an optical fiber access tool which allows easy access to optical fibers located within a monotube without requiring the severing of the longitudinally extending strength members.

While the preferred embodiment admirably achieves the objects of the invention, it will be appreciated that departures can be made by those skilled in the art without departing from the spirit and scope of the invention which is limited only by the following claims:

What is claimed is:

1. A tool for accessing optical fibers within a monotube of a monotube optical fiber cable, said monotube optical fiber cable having a single monotube extending longitudinally the length of said cable and at least one strength member extending parallel with said monotube, said tool including:

a body having means for forming a longitudinally extending monotube channel adapted to receive said monotube and for forming at least one longitudinally extending strength member channel adapted to simultaneously receive said strength member, said monotube channel and said at least one strength member channel being disposed alongside one another to simultaneously receive said monotube and said at least one strength member;

a blade having a cutting edge; and means for mounting said blade so that the cutting edge is offset from the axis of the monotube channel and extends across the monotube channel to cut into a monotube that is disposed in said monotube channel without extending with into said at least one strength member channel and movement of the tool longitudinally along the monotube removes an outer portion of the monotube.

2. The tool of claim 1, wherein said blade mounting means includes means for adjusting the position of said blade so that the depth of the cutting edge into the monotube channel may be selected.

3. The tool of claim 2, wherein said adjusting means includes:

a sloping surface of said channel forming means disposed at an acute angle with the monotube channel axis, said blade being slidably positioned on said surface; and means for securing said blade to said sloping surface.

4. The tool of claim 3, wherein said securing means includes a threaded aperture in said sloping surface, a slot in said blade and a screw inserted through said slot and threadably received into said threaded aperture.

5. The tool of claim 2, further including means for gauging the depth of said blade into said monotube channel.

6. The tool of claim 5, wherein said gauging means is a cylinder having a diameter substantially equal to that of the monotube and having a chord removed corresponding to the desired depth of insertion of said cutting edge into said monotube.

7. The tool of claim 1, wherein said channel forming means comprises means for forming two longitudinally extending strength member channels adapted to receive corresponding strength members, said strength member channels being disposed on opposite sides of said monotube channel.

8. The tool of claim 1, wherein said body has an aperture extending therethrough and wherein said channel forming means is dimensioned for cooperating with said body within said aperture.

9. The tool of claim 8, wherein said channel forming means comprises an insert adapted to be secured within said aperture of said body, said insert comprising a top and a bottom half, said halves being substantially identical in shape.

10. The tool of claim 9, wherein said top and bottom halves each have a central groove extending the length thereof, each central groove having a semi-circular cross-section, and said bottom half further having a strength member groove on both sides of and parallel to said central groove.

11. A tool for accessing optical fibers within a monotube of a monotube optical cable, said monotube optical fiber cable having a single monotube and at least one longitudinally extending strength member, said tool comprising:

a body comprising upper and lower portions, each having outwardly opening grooves extending the length of said body, said grooves forming a longitudinally extending aperture when said upper and lower portions are secured together;

means cooperating with said body for forming a monotube channel adapted to receive said monotube and for forming at least one strength member channel adapted to receive said strength member, said means being dimensioned for cooperating with said body in said aperture and being secured to said body;

a blade having a cutting edge; and means for mounting said blade so that the cutting edge is offset from the axis of the monotube channel and extends across the monotube channel to cut into a monotube that is disposed in said monotube channel without extending into said at least one strength member channel and movement of the tool longitudinally along the monotube removes and outer portion of the buffer tube.

12. The tool of claim 11, wherein said channel forming means comprises first and second portions each having an outwardly opening monotube groove extending the length of said portion, said monotube grooves forming said monotube channel when said channel forming means first and second portions are juxtaposed, at least one of said channel forming means first and second portions further comprising at least one outwardly opening strength member groove extending the length of said portion, said strength member groove forming said strength member channel when said channel forming means first and second portions are juxtaposed together.

13. The tool of claim 12, wherein at least one of said channel forming means first and second portions comprises two strength member grooves extending the length of said portion, said strength member grooves being disposed on opposite sides of and parallel with said monotube groove.

14. The tool of claim 12, wherein said channel forming means first portion is secured to said body first portion and said channel forming means second portion is secured to said body second portion.

15. The tool of claim 14, wherein said body first portion is hingedly connected to said body second portion.

* * * * *

UNITED STATES PATENT AND TRADEMARK OFFICE
CERTIFICATE OF CORRECTION

PATENT NO. : 5,140,751

DATED : AUGUST 25, 1992

INVENTOR(S) : ALISON M. FAUST

It is certified that error appears in the above-identified patent and that said Letters Patent is hereby corrected as shown below:

COLUMN 7, LINE 13, "WITH" SHOULD BE OMITTED

Signed and Sealed this

Twenty-fourth Day of August, 1993

*Attest:*

BRUCE LEHMAN

*Attesting Officer*      *Commissioner of Patents and Trademarks*